(12) United States Patent
Reynolds

(10) Patent No.: US 6,704,850 B1
(45) Date of Patent: Mar. 9, 2004

(54) METHOD AND APPARATUS FOR DETERMINING THE WIDTH OF A MEMORY SUBSYSTEM

(75) Inventor: Bart Reynolds, Seattle, WA (US)

(73) Assignee: Triscend Corporation, Mountain View, CA (US)

( * ) Notice: Subject to any disclaimer, the term of this patent is extended or adjusted under 35 U.S.C. 154(b) by 135 days.

(21) Appl. No.: 09/648,406

(22) Filed: Aug. 23, 2000

(51) Int. Cl.$^7$ .............................................. G06F 12/00
(52) U.S. Cl. ....................... 711/170; 711/102; 711/105; 710/107
(58) Field of Search ................. 711/170, 171, 711/102, 103, 105; 710/305, 111, 113, 107

(56) References Cited

U.S. PATENT DOCUMENTS

| | | | | |
|---|---|---|---|---|
| 5,175,836 A | 12/1992 | Morgan | ...................... | 711/172 |
| 5,504,439 A | 4/1996 | Tavana | ....................... | 326/38 |
| 5,504,875 A | * 4/1996 | Mills et al. | ................. | 711/171 |
| 5,677,638 A | 10/1997 | Young et al. | ................ | 431/354 |
| 5,761,478 A | * 6/1998 | Chen et al. | .................. | 711/172 |
| 5,784,637 A | 7/1998 | Sawase et al. | ................. | 712/37 |
| 5,844,854 A | 12/1998 | Lee | ........................ | 365/230.01 |
| 5,893,927 A | * 4/1999 | Hovis | ........................ | 711/171 |
| 5,901,295 A | 5/1999 | Yazdy | ....................... | 710/113 |
| 5,935,230 A | 8/1999 | Pinai et al. | .................. | 710/111 |
| 5,936,424 A | 8/1999 | Young et al. | ................ | 326/139 |
| 6,141,739 A | 10/2000 | Provence et al. | ........... | 711/211 |
| 6,184,705 B1 | 2/2001 | Cliff et al. | ..................... | 326/38 |
| 6,191,608 B1 | 2/2001 | Cliff et al. | ..................... | 326/38 |
| 6,262,594 B1 | * 7/2001 | Cheung et al. | ............... | 326/38 |
| 6,401,164 B1 | 6/2002 | Bartoli et al. | ................. | 326/39 |
| 6,457,108 B1 | * 9/2002 | Hsu et al. | .................... | 711/154 |

FOREIGN PATENT DOCUMENTS

| | | |
|---|---|---|
| EP | 0 139 254 A1 | 5/1985 |
| EP | 0 306 962 A2 | 3/1989 |
| EP | 0 536 793 A2 | 4/1993 |
| WO | WO 00/22546 A2 | 4/2000 |

OTHER PUBLICATIONS

"Protocol Extensions to Microprocessor Memory Bus to Support Extend Extended Address Space," XP000453193, IBM Technical Disclosure Bulletin, vol. 35, No. 5, p. 389 (May 1994).

* cited by examiner

*Primary Examiner*—Matthew Kim
*Assistant Examiner*—Brian R. Peugh
(74) *Attorney, Agent, or Firm*—Blakely, Sokoloff, Taylor & Zafman LLP

(57) ABSTRACT

A method and apparatus for determining a width of an external memory is described. The method comprises reading a data from memory, and if the data matches an expected data key, determining the width of the memory.

22 Claims, 5 Drawing Sheets

| Column 0<br>CS = 0<br>Addr [31:2]<br>Data [7:0] | Column 1<br>CS = 1<br>Addr [31:2]<br>Data [15:8] | Column 2<br>CS = 2<br>Addr [31:2]<br>Data [23:16] | Column 3<br>CS = 3<br>Addr [31:2]<br>Data [31:24] |
|---|---|---|---|
| data | data | data | data |
| data | data | data | data |
| Byte 4 = A1 | Byte 5 = B1 | Byte 6 = C1 | Byte 7 = D1 |
| Byte 0 = A0 | Byte 1 = B0 | Byte 2 = C0 | Byte 3 = D0 |

FIG. 5A

| Column 0<br>CS = 0<br>Addr [31:2]<br>Data [7:0] | Column 1<br>CS = 1<br>Addr [31:2]<br>Data [15:8] |
|---|---|
| data | data |
| data | data |
| Byte 6 = C1 | Byte 7 = D1 |
| Byte 4 = A1 | Byte 5 = B1 |
| Byte 2 = C0 | Byte 3 = D0 |
| Byte 0 = A0 | Byte 1 = B0 |

FIG. 5B

| Column 0<br>CS = 0<br>Addr [31:2]<br>Data [7:0] |
|---|
| data |
| data |
| Byte 7 = D1 |
| Byte 6 = C1 |
| Byte 5 = B1 |
| Byte 4 = A1 |
| Byte 3 = D0 |
| Byte 2 = C0 |
| Byte 1 = B0 |
| Byte 0 = A0 |

FIG. 5C

METHOD AND APPARATUS FOR DETERMINING THE WIDTH OF A MEMORY SUBSYSTEM

FIELD OF THE INVENTION

The present invention relates to system-on-chip, and more specifically, to configuring determining memory width.

BACKGROUND

Determining the width of external memory is non-trivial. In order to correctly read from memory, the memory interface unit (MIU) has to be correctly configured. This is especially important for circuits that use external memory for configuration.

System-on-chip designs generally include a memory subsystem composed of one or more memory devices. The system designer generally decides, during the design phase, both the width and size of the memory subsystem to be included in the system.

The configurable system-on-chip generally uses an external non-volatile memory device to store configuration information. During the initialization of the configurable system on a chip, the system-on-chip loads its configuration from that external memory device.

In the prior art, programmable chips, such as the configurable-system-on-chip, central processing units (CPUs), and field programmable gate arrays (FPGAs) support external memory subsystems of a single width.

Existing programmable chips that support different memory subsystem widths allow the width to be specified in one of two ways: data loaded into the chip from a third subsystem or as constant inputs to the chip, by using one or more input pins tied high or low. Data may be loaded into the chip from a third subsystem, which may be a computer or similar system. Thus, when the system-on-chip is initialized, it must be connected to an independent third system, which may be used to initialize it. This is disadvantageous, because it makes the circuit non-self-configuring and requires the presence of an external system.

Using external input pins tied high or low is an alternative prior art option. However, this uses up external input pins. Because pin count is limited, using up external input pins is disadvantageous as well.

SUMMARY OF THE INVENTION

A method and apparatus for determining a width of an external memory is described. The method comprises reading a data from memory, and if the data matches an expected data key, determining the width of the memory.

Other objects, features, and advantages of the present invention will be apparent from the accompanying drawings and from the detailed description that follows below.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 5A–C are block diagrams of various embodiments of a memory subsystem including a key in accordance with the present invention.

DETAILED DESCRIPTION

The present system allows a system to automatically determine the width of a memory subsystem, without having explicit prior information about the width. This capability is important in a configurable system-on-chip (CSoC), because the configurable system-on-chip obtains its configuration from an external memory subsystem whose width is not known when the configurable system-on-chip is fabricated.

This capability is also useful for creating a family of products based on the same system-on-chip configuration. Each product may contain a different memory width than the other products in the same product family. Because a single configurable system-on-chip configuration may be useful in multiple systems with different memory dimensions, the CSoC should support multiple external memory widths. Another advantage of using this configurability is that those pins that are not used by the actual memory may be reused for other purposes by the CSoC such as performing as inputs and outputs to the programmable logic.

Figure 1:
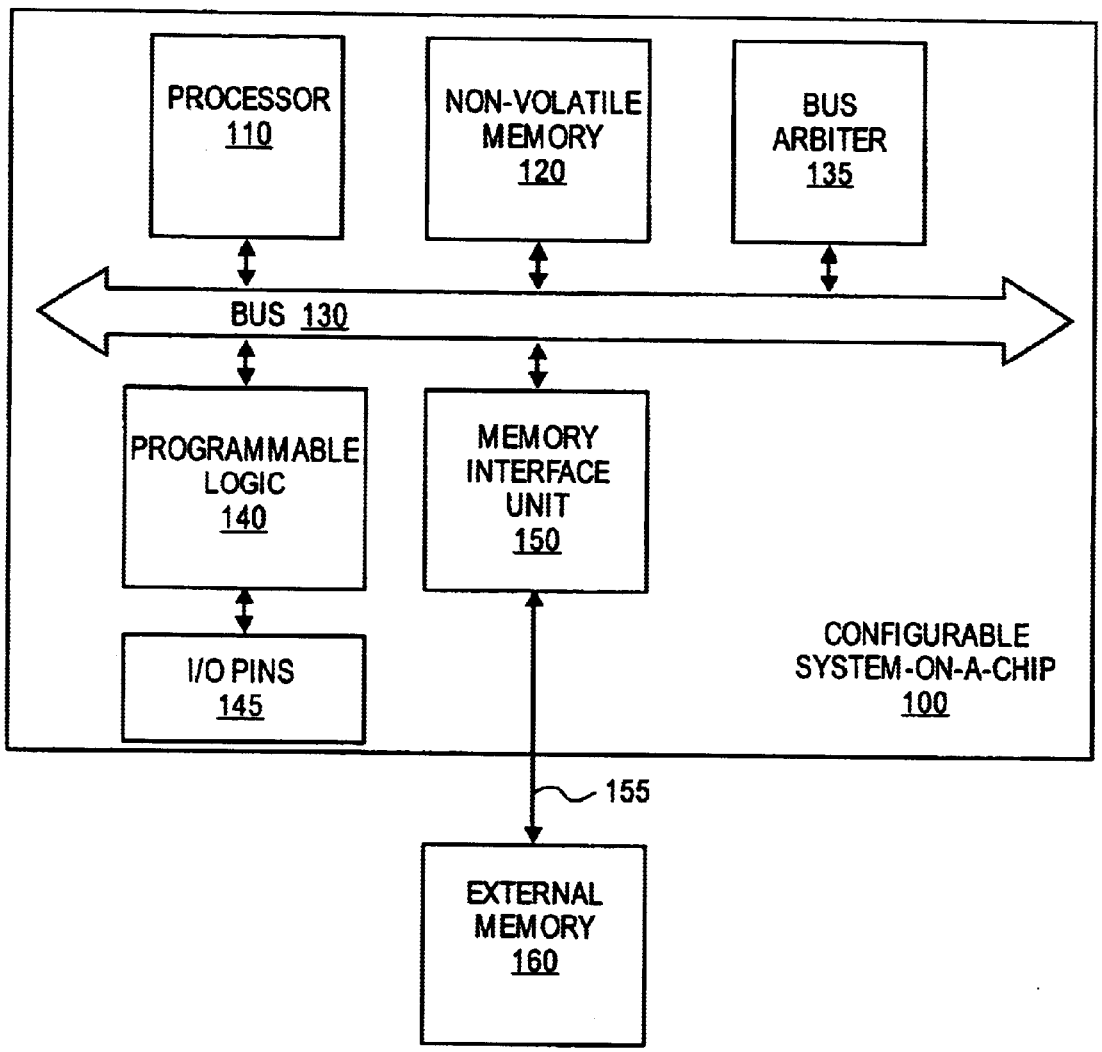
FIG. 1 is a block diagram of one embodiment of a system-on-chip in which the system of the present invention may be implemented.

FIG. 1 is a block diagram of one embodiment of a system-on-chip in which the system of the present invention may be implemented. The system-on-chip (CSoC) 100 includes a central processing unit (CPU) 110. For one embodiment, the CPU 110 is an ARM7TDMI. The CPU 110 is coupled to a non volatile memory 120. For one embodiment, the non-volatile memory 120 is a read-only-memory (ROM) 120. For one embodiment, the ROM 120 may be a WORM (write once read many) device, a flash memory, or another type of memory that is non-volatile. In general, ROM 120 is a non-volatile memory that is incorporated within the CSoC substrate.

Bus 130 couples together the processor 110, ROM 120, and programmable logic 140. For one embodiment, bus 130 may include a bus arbiter 135, which permits the bus 130 to be a multi-master bus.

Programmable logic 140 is a programmable logic, which may be programmed by the processor 110 or any other bus master such as a JTAG unit, DMA controller, etc. The programmable logic 140 may be a programmable logic array (PLA), utilizing programmable inputs to both the AND array and the OR array. The programmable logic 140 may alternatively be a programmable array logic (PAL) that utilizes programmable inputs to the AND array, the inputs to the OR array being fixed. For one embodiment, the programmable logic 140 is a field programmable gate array (FPGA). Alternative methods of implementing the programmable logic 140 may be used.

Generally, the configuration of programmable logic 140 is written to a static random access memory (SRAM), not shown. The system may configure or reconfigure the programmable logic 140 at any time after power is applied to the system by writing new configuration information into the SRAM.

For one embodiment, the input/output (I/O) 145 is coupled to the CSOC 100 through programmable logic 140.

Memory interface unit 150 is further coupled to the bus 130. Memory interface unit 150 provides a connection 155 to external memory 160 coupled to CSoC 100. The external memory 160 may be used to store the configuration information used to configure programmable logic 140. As will be described below, memory interface unit 150 is configured using data from ROM 120, to permit access to external memory 160. External memory 160 is then used to complete configuration of programmable logic 140, and CSoC 100.

Figure 2:
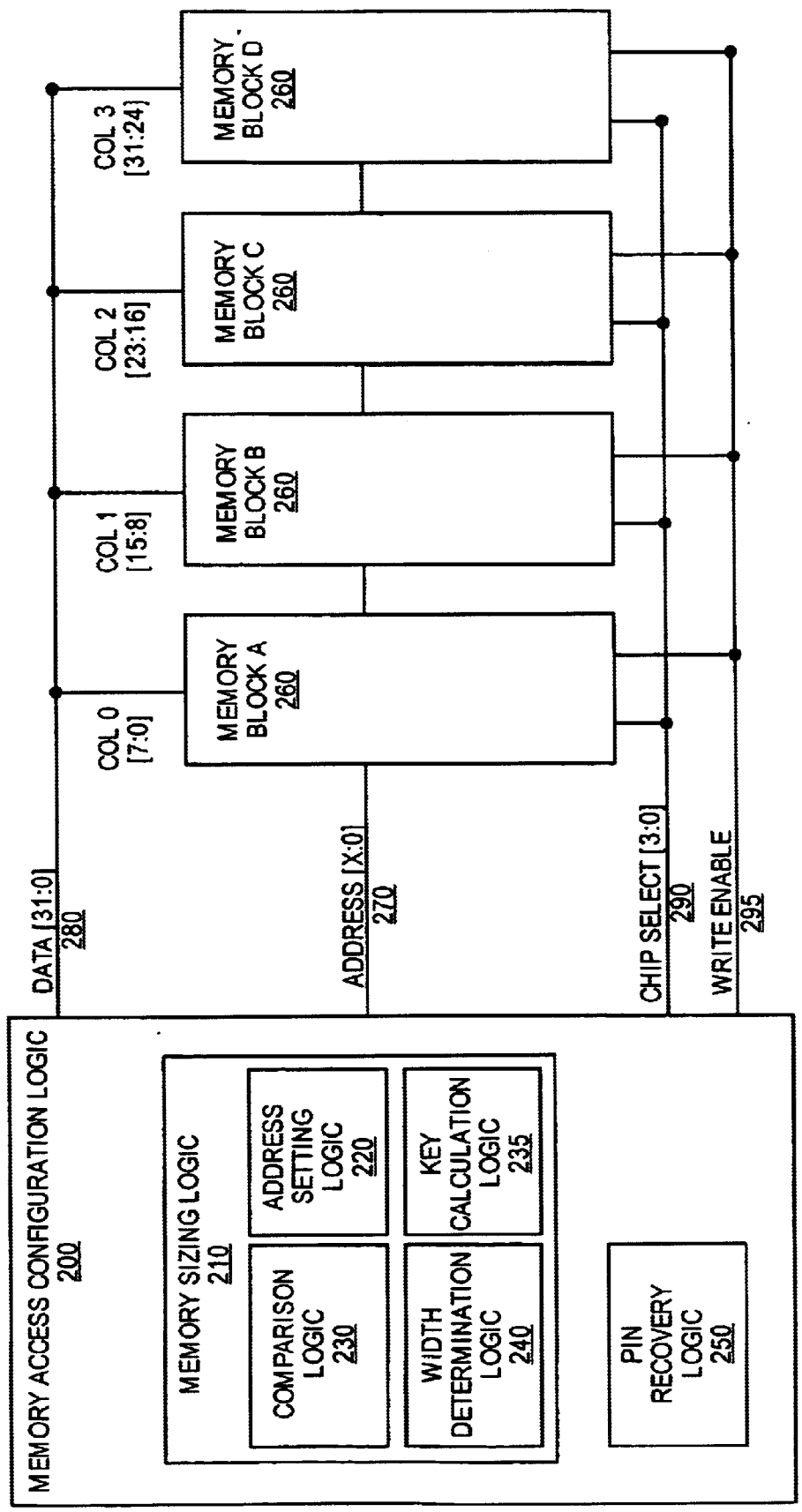
FIG. 2 is a block diagram of one embodiment of the memory configuration logic.

FIG. 2 is a block diagram of one embodiment of the memory access configuration logic 200 which is a part of memory interface unit 150. Memory access configuration logic 200 includes memory sizing logic 210 and other logic 200.

External memory 160 includes multiple memory blocks 260, shown as four blocks A–D in this example. For the four memory blocks 260 shown, the data lines 280 are as designated, for a 32 bit memory. Note that this is only one possible arrangement. Alternative memory arrangements may be used. This particular arrangement is merely used as an example.

Address lines 270 are coupled to all of the memory blocks 260. Chip select 290 and write enable 295 are used to access individual memory blocks 260 for reading and writing. Data lines 280 are coupled to memory blocks 260 such that eight data lines 280 are coupled to each of the memories. This arrangement indicates that the memory is treated as a 32-bit wide memory.

Memory sizing logic 210 includes address setting logic 220. Address setting logic 220 sets the addressing size of memory 160. For one embodiment, memory 160 may be configured as a 32 bit memory, a 16 bit memory, an 8 bit memory, or a memory 160 of another width. Address setting logic 220 sets an access which assumes a particular memory width.

Comparison logic 230 compares a key read from memory, using the configuration set by address setting logic 220, with an expected value 235. The expected value 235 may be a constant such as a stored value. In another embodiment, the expected value 235 may be computed, as a function of other values. For example, the expected value 235 may be a function of a stored constant and the current address. This expected value 235 is the data key which is used to determine the width of the memory.

If the data read from memory 160 matches the key value, the comparison logic 230 passes this data to the width determination logic 240. The width determination logic 240 indicates to the memory interface unit 150 that the current address arrangement is the proper arrangement. The width determination logic 240 further determines whether there are any extra pins allocated to memory access that are not used by this particular memory arrangement. For example, if the original memory allocation was for a 32 bit wide memory, if the actual memory arrangement is an 8 bit wide memory, 26 pins may be recovered, and reconfigured for other use. Thus, pin recovery logic 250 indicates to the CSoC 100 that up to 24 data pins (pins 31:8) as well as other pins may be recovered and reconfigured for other use. This may be useful, since it permits additional pin usage, while providing a sufficient number of pins for external memory access.

Note that the information in memory blocks 260 must be formatted appropriately for use with the CSoC 100. The key must be programmed into the memory 160 prior to coupling the memory 160 to the CSoC 100. This may be done when the configuration information is encoded into memory 160.

Figure 3:
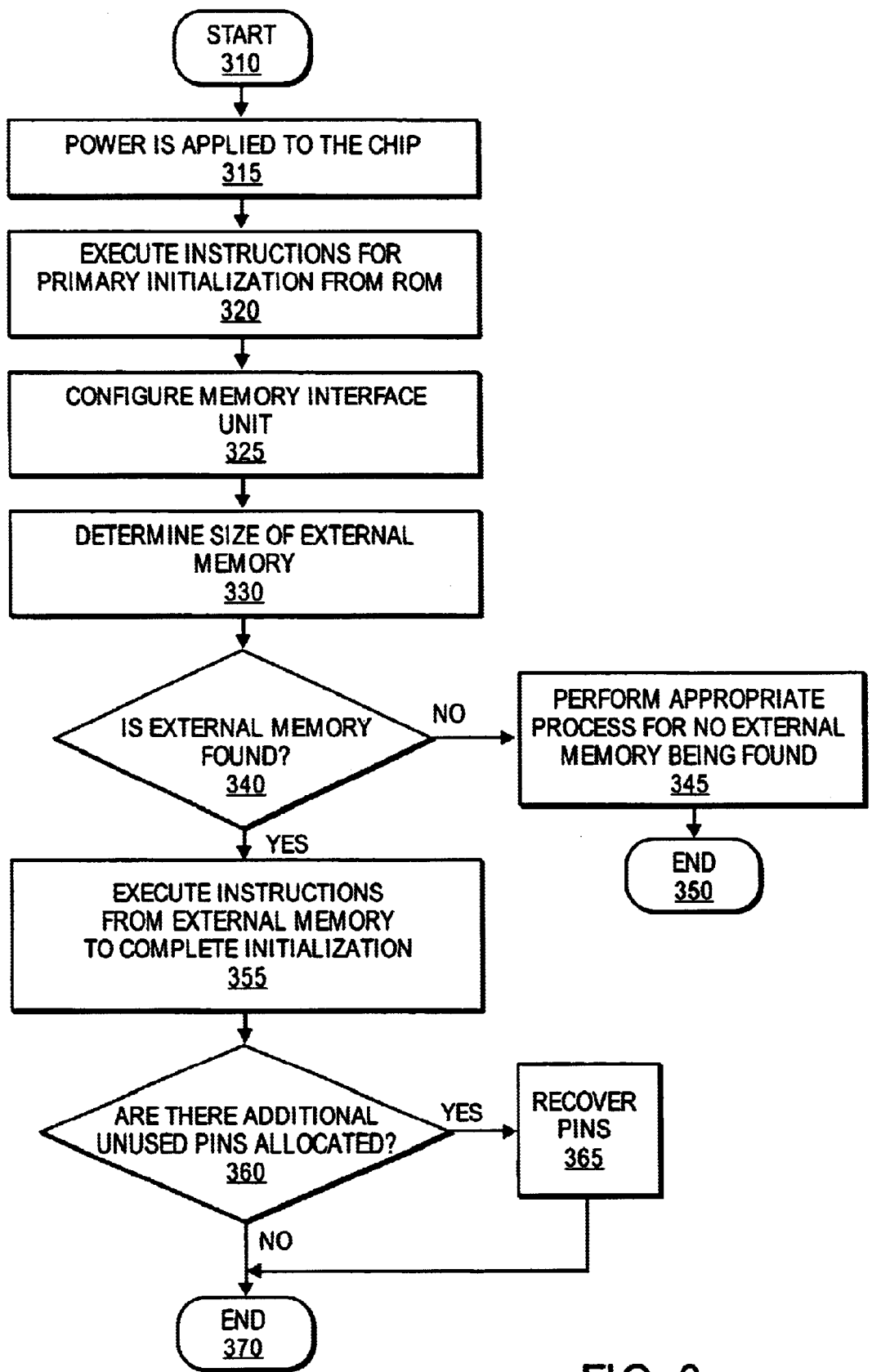
FIG. 3 is a flowchart of one embodiment of the memory configuration process.

FIG. 3 is a flowchart of one embodiment of the memory configuration process. The process starts at block 310. At block 315, power is applied to the system-on-chip. For one embodiment, this may take place at initialization.

At block 320, instructions are executed for primary initialization, of the CPU and those portions of the programmable logic which are used for basic input/output functions. For one embodiment, the internal ROM is used for this primary initialization.

At block 325, the memory interface unit (MIU) is configured. The memory interface unit is configured, for one embodiment, by setting a particular first memory arrangement. For one embodiment, the actual order of the memory widths to be tested are set using the ROM. For one embodiment, the expected value that is included in the external memory is also passed to the memory access configuration logic at this point. Because the ROM may be programmable by the user, the expected value may reflect appropriate key combinations. The expected value should be designed to be an unlikely combination, such that the system would not accidentally find a set of data that corresponded to the key, and thus misconfigure the system.

At block 330, the system determines the size of the external memory. The process of determining the memory size is illustrated in more detail in FIG. 4. At block 340, the process determines if a memory was found. If no external memory is found, at block 345, the appropriate steps are taken for this case. For one embodiment, user is notified that the programmable logic is not initialized, and that the external memory was not found, at block 345. For another embodiment, the CsoC moves to a low power state. The process then ends at block 350, or waits until an external memory is detected.

At block 355, external memory is used to configure programmable logic. For one embodiment, external memory may also have additional information such as software instructions for the CPU or initialization information for other system components.

At block 360, the process determines whether there are pins currently configured for use by the MIU that are not needed to access external memory. For example, the MIU may be configured for a 32-bit wide memory. If the memory is less than 32 bits wide, then the pins not required by the MIU are identified as recoverable for other use.

If there are recoverable pins, the pins are recovered at block 370. For one embodiment, recovering a pin comprises configuring the MIU to avoid interacting with that pin and configuring the programmable logic to interact with that pin. The process ends at block 365.

Figure 4:
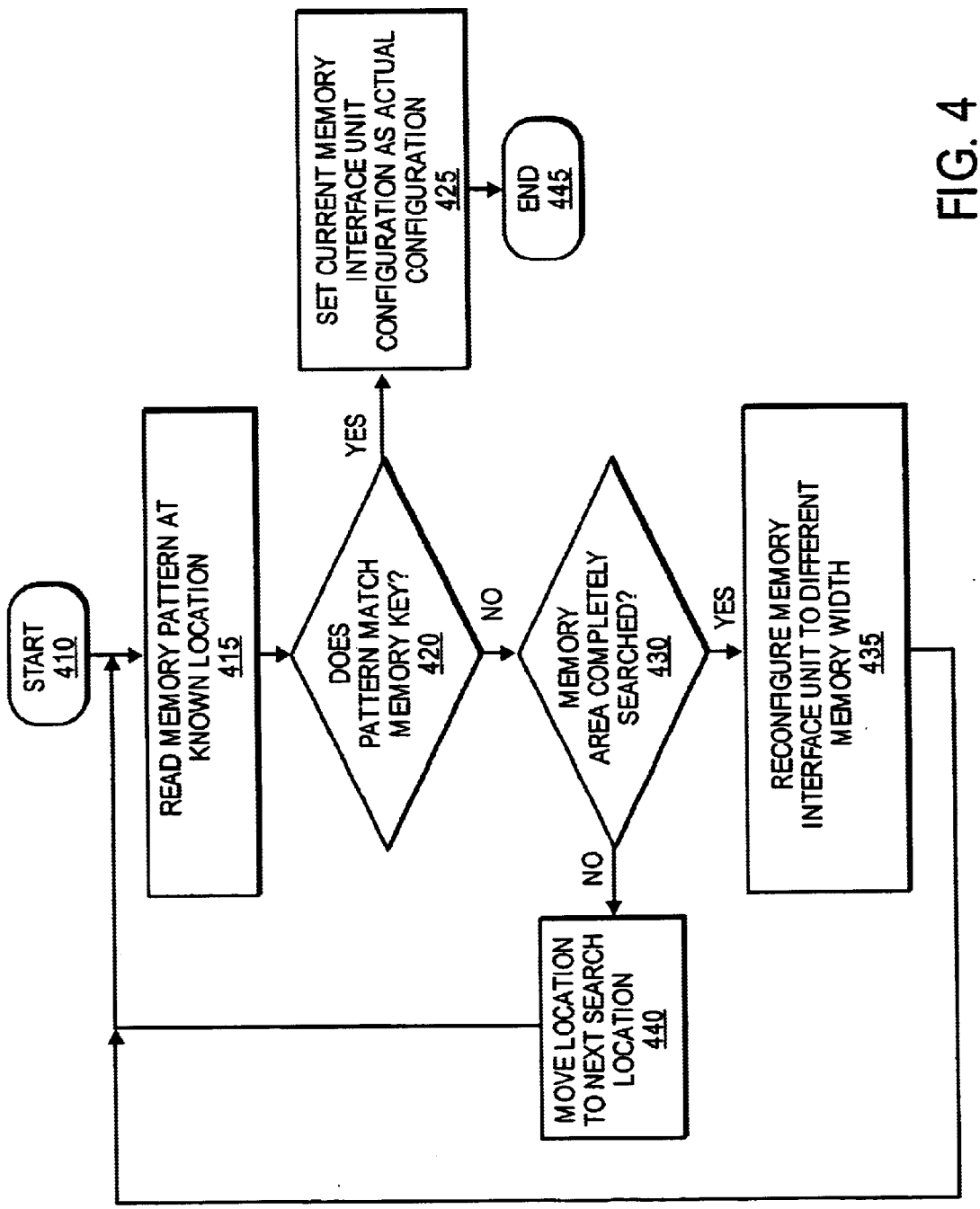
FIG. 4 is a more detailed flowchart of determining a size of an external memory.

FIG. 4 is a more detailed flowchart of determining the width of an external memory. The process starts at block 410. This flowchart corresponds, for one embodiment, to block 330 of FIG. 3, e.g. determining a width of an external memory.

At block 415, the memory pattern is read from a known memory location. The known memory location is a value or set of values designed into the memory interface unit, or determined during a prior phase of system initialization. For one embodiment, the system is designed such that the memory key is stored in a certain location, or within a certain location range. For example, by convention the memory key may be expected in the last 256 bits of memory. This permits the system to simply tie the high address bits to one, while testing for the location of the memory key.

At block 420, the process determines whether the memory pattern retrieved from memory matches the expected value. If the memory pattern matches the value, the process continues to block 425. At block 425, it is determined that the current memory arrangement is correct, and the process then terminates at block 445.

If the memory pattern does not match the key, the process continues to block 430. At block 430, the process determines whether the area of memory in which the key could be found has been completely searched. If the entire area of memory has been searched, the process continues to block 435.

At block 435, the memory interface unit is reconfigured to a different memory width. For example, the memory access may be reconfigured to assume that the memory is an eight bit wide memory. The search starting point is also reset to start from the first area. The process then returns to block 415, to read the memory and determine whether the memory key has been found. For one embodiment, the system searches memory configurations in order of most common usage. For another embodiment, the system searches for memory configurations from highest to lowest, since a larger memory generally implies that latency is more important, and thus the time for finding the appropriate configuration is reduced for large memory/low latency systems. For yet another embodiment, the memory is searched in the following order: 32-bit configuration, 8-bit configuration, and 16-bit configuration.

If, at block 430, it is found that not the entire memory has been searched, the search is moved to the next search location, at block 440. For one embodiment, the new search location is located at a fixed offset from the previous search location. For one embodiment, the search locations are located at 16 byte boundaries. As discussed above, the system is designed such that the key is located within a preset memory area, such as the lowest or highest 256K of memory. The process then returns to block 415, to read the memory at that point, and determine whether the memory pattern matches the key.

For one embodiment, this cycle may automatically end if all of the memory configurations have been tested and the key is not found. In one embodiment, the system initialization halts and the system enters a low power mode if the key is not found. In another embodiment, the user is either warned to replace the memory with an appropriately keyed memory, or to enter the memory size manually.

FIGS. 5A–C are block diagrams of various embodiments of a memory subsystem including a key in accordance with the present invention. FIG. 5A illustrates an external memory subsystem that is 32-bits wide such as in FIG. 2. The expected value or key, is the 8-byte hexadecimal value of "A0B0C0D0A1B1C1D1" which resides in contiguous bytes at addresses 0–7. Byte 0 in column 0 (memory block A) contains A0, byte 1 in column 1 (memory block B) contains B0, and so forth. This is shown in FIG. 5A.

Column 0 contains bytes 0, 4, 8, 12, etc. It connects to data bits 0–7. Column 1 contains bytes 1, 5, 9, 13, and connects to data bits 8–15. Column 2 contains bytes 2, 6, 10, 14, and connects to data bits 16–23. And column 3 contains bytes 3, 7, 11, 15, and connects to data bits 24–32. Thus, each column is implemented as an 8-bit memory device connected to a unique chip-select and a different data byte on the external memory bus.

When the primary initialization program assumes that the memory is 8-bits wide, it attempts to read addresses 0–7. Bytes 0 and 4 are read as expected, but bytes 1–3 and 5–7 are not read properly, because the data appears on the wrong byte lane of the external memory bus. Using an 8-bit wide memory configuration, bytes 1–3 and 5–7 are not read at all, since it is assumed that all data comes in on the first eight bits of the external memory bus. Therefore, the system can not successfully read the key. Only when the primary initialization program assumes that the memory is 32 bits wide does the system successfully detect the expected data signature at consecutive addresses.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of determining a width of an external memory comprising:

configuring a memory interface unit to a first memory arrangement;

determining if a memory key is found in the memory using the first memory arrangement;

if the memory key is found, identifying the first memory arrangement as the actual memory arrangement; and otherwise, reconfiguring the memory interface unit.

2. The method of claim 1, further comprising:

determining if the actual memory arrangement leaves any extra pins that are not used for memory access; and if there are extra pins, recovering the extra pins for other purposes.

3. The method of claim 1, further comprising:

configuring the memory interface unit using an on-chip read-only-memory.

4. The method of claim 1, further comprising:

completing system configuration using the external memory, after the correct memory arrangement is determined.

5. The method of claim 1, wherein the first memory arrangement comprises a 32 bit wide memory arrangement.

6. The method of claim 1, wherein the memory arrangements are as follows: 32 bit wide, 8 bit wide, and 16 bit wide.

7. The method of claim 1, wherein the first memory arrangement is chosen based on a most likely memory size.

8. A method of initializing a configurable system-on-chip comprising:

initializing a memory interface unit;

determining a size of an external memory;

accessing an internal read only memory (ROM);

partially configuring the configurable system-on-chip from the ROM; and configuring the configurable system-on-chip from the external memory.

9. The method of claim 8, wherein determining a size of the external memory comprises:

determining if a memory key is found in the memory using a first memory arrangement;

if the memory key is found, identifying the first memory arrangement as the actual memory arrangement; and otherwise, reconfiguring the memory interface unit.

10. The method of claim 9, wherein the first arrangement is determined based on a most likely memory size.

11. The method of claim 8, further comprising:

determining if an actual memory arrangement leaves any extra pins that are not used for memory access; and if there are extra pins, reconfiguring the extra pins for other purposes.

12. The method of claim 8, wherein the memory arrangements are as follows: 32 bit wide, 8 bit wide, and 16 bit wide.

13. An apparatus for configuring a configurable system-on-chip comprising:

a programmable logic:

a memory access configuration logic comprising:

an address setting logic to configure a memory interface unit (MIU) to access an external memory;

a comparison logic to determine whether the MIU is correctly configured, wherein the comparison logic obtains memory data from the external memory and compares the memory data to a memory key to determine whether the external memory is properly arranged;

a width determination logic to determine an accurate arrangement of the MIU based on the memory data obtained from the external memory.

14. The apparatus of claim 13, further comprising a Read Only Memory (ROM) to initialize the MIU to enable access to the external memory.

15. The apparatus of claim 13, further comprising a pin recovery logic for recovering pins not used by the MIU.

16. The apparatus of claim 13, wherein the external memory is used to complete configuration of the MIU, after the correct memory arrangement is determined.

17. A memory interface unit (MIU) to determine a size of an external memory the MIU comprising an address setting logic to configure the MIU to access an external memory:

a comparison logic to determine whether the MIU is correctly configured;

a width determination logic to determine the accurate arrangement of the MIU; and a pin recovery logic for reassigning pins not used by the MIU.

18. The MIU of claim 17, wherein the comparison logic obtains memory data from the memory and compares the memory data to a memory key to determine whether the memory is properly configured.

19. The MIU of claim 17, wherein the MIU is only partially configured prior to determining a size of the external memory, and the external memory is used to fully configure the MIU.

20. The MIU of claim 17, wherein the external memory is used to complete configuration of the MIU, after the correct memory arrangement is determined.

21. An apparatus for determining a width of an external memory comprising:

a means for configuring a memory interface unit to a first memory arrangement;

a determining means to determine if a memory key is found in the memory using the first memory arrangement;

if the memory key is found, an identifying means to identify the first memory arrangement as the actual memory arrangement; and otherwise, a reconfiguring means to reconfigure the memory interface unit to a second memory arrangement.

22. The apparatus of claim 21, further comprising:

a determining means to determine if the actual memory arrangement leaves any extra pins that are not used for memory access; and a pin recovery means to, if there are extra pins, recover the extra pins for other purposes.

* * * * *